United States Patent
Chang et al.

(10) Patent No.: US 7,886,317 B2
(45) Date of Patent: Feb. 8, 2011

(54) VIBRATION ABSORBER

(75) Inventors: Chi-Shen Chang, Hsinchu Hsien (TW);
Tzuan-Ren Jeng, Hsinchu Hsien (TW);
Shyh-Jier Wang, Hsinchu Hsien (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 1260 days.

(21) Appl. No.: 11/450,421

(22) Filed: Jun. 12, 2006

(65) Prior Publication Data

US 2007/0130577 A1  Jun. 7, 2007

(30) Foreign Application Priority Data

Nov. 29, 2005  (TW) .............................. 94141840 A (51) Int. Cl.
  *G11B 33/08*  (2006.01)
  *F16F 15/00*  (2006.01)
(52) U.S. Cl. ................................. 720/651; 267/140.15
(58) Field of Classification Search ......... 188/378–380; 267/136, 140.13–140.15, 137, 140.2, 141.1; 720/651, 679, 681, 688, 692–694; 369/44.32, 369/53.18, 139, 247.1, 263.1; 360/97.02–97.04
See application file for complete search history.

(56) References Cited

U.S. PATENT DOCUMENTS

| | | | | |
|---|---|---|---|---|
| 4,700,817 A | * | 10/1987 | Kondo et al. ............... | 188/380 |
| 5,410,845 A | * | 5/1995 | Sakamoto et al. ........... | 52/167.2 |
| 5,796,687 A | * | 8/1998 | Baba ....................... | 369/44.29 |
| 5,884,736 A | * | 3/1999 | Burdisso et al. ............ | 188/379 |
| 6,098,969 A | * | 8/2000 | Nagarajaiah ................ | 267/136 |
| 6,198,715 B1 | * | 3/2001 | Kouno et al. ................ | 720/702 |

* cited by examiner

*Primary Examiner*—Wayne R Young
*Assistant Examiner*—Nathan A Danielsen
(74) *Attorney, Agent, or Firm*—Birch, Stewart, Kolasch & Birch, LLP (57) ABSTRACT

A vibration absorber provided on an optical disk drive module of a disk drive for suppressing vibration produced by the optical disk drive module at various speeds. The vibration absorber at least has a body, dampers, elastic members, an actuator and a controller. The body is secured on the optical disk drive module. The dampers elastically and vertically shift on the body. The elastic members are provided on the body for providing elasticity in shifting of the damper. The actuator is provided on the body and coupled to the damper for providing a driving force for the vertical shifting of the damper. The controller controls the driving force outputted by the actuator based on the change in rotational speed of the optical disk drive module, so as to change the elasticity in vertical shifting of the damper to reduce the shifting and corresponding vibration of the optical disk drive module.

20 Claims, 7 Drawing Sheets

System parameters

| | | | |
|---|---|---|---|
| $m_1$ | 0.18526 kg | $k_1$ | 10145 N/m |
| $m_2$ | 0.00984 kg | $k_2$ | 2000 N/m |
| $C_1$ | 2.6190 kg/s | $p$ | $4 \times 10^{-8}$ kg-m |
| $C_2$ | 0.04526 kg/s | $K_f$ | 1.6027 N/A |

Simulation and experimental results

| | 6000 rpm | | 10000 rpm | |
|---|---|---|---|---|
| | Simulation | Experimentation | Simulation | Experimentation |
| no vibration absorber | $0.2971 \times 10^{-3}$ mm | $0.3064 \times 10^{-3}$ mm | $0.2395 \times 10^{-3}$ mm | $0.2173 \times 10^{-3}$ mm |
| traditional vibration absorber | $0.3238 \times 10^{-3}$ mm | $0.3140 \times 10^{-3}$ mm | $0.2430 \times 10^{-3}$ mm | $0.2155 \times 10^{-3}$ mm |
| vibration absorber of the present invention | $0.2009 \times 10^{-3}$ mm | $0.1960 \times 10^{-3}$ mm | $0.1396 \times 10^{-3}$ mm | $0.1271 \times 10^{-3}$ mm |

FIG. 6C

VIBRATION ABSORBER

FIELD OF THE INVENTION

The present invention relates to a vibration absorber, and more particularly, to a vibration absorber applicable to disk drives.

BACKGROUND OF THE INVENTION

In succession to blue ray HD-DVD, the optical disk storage technology is estimated to seek even higher density storage media, such as near field storage, 3D storage technology etc. This causes the distance between the pickup head of a disk drive and a disc to be smaller, thus the pickup head of the disk drive is more sensitive to the vibrating interference of the disc in rotation. Since a disc in rotation generates a significant amount of vibration, so the optical disk drive module in the disk drive adapts the rotational speed of the disc according to the read/write status such that the speed is suitable for data read, write or erase. The -rotational speed of a disk drive is therefore not constant, and the generated main vibrating frequency is not constant either.

Figure 1:
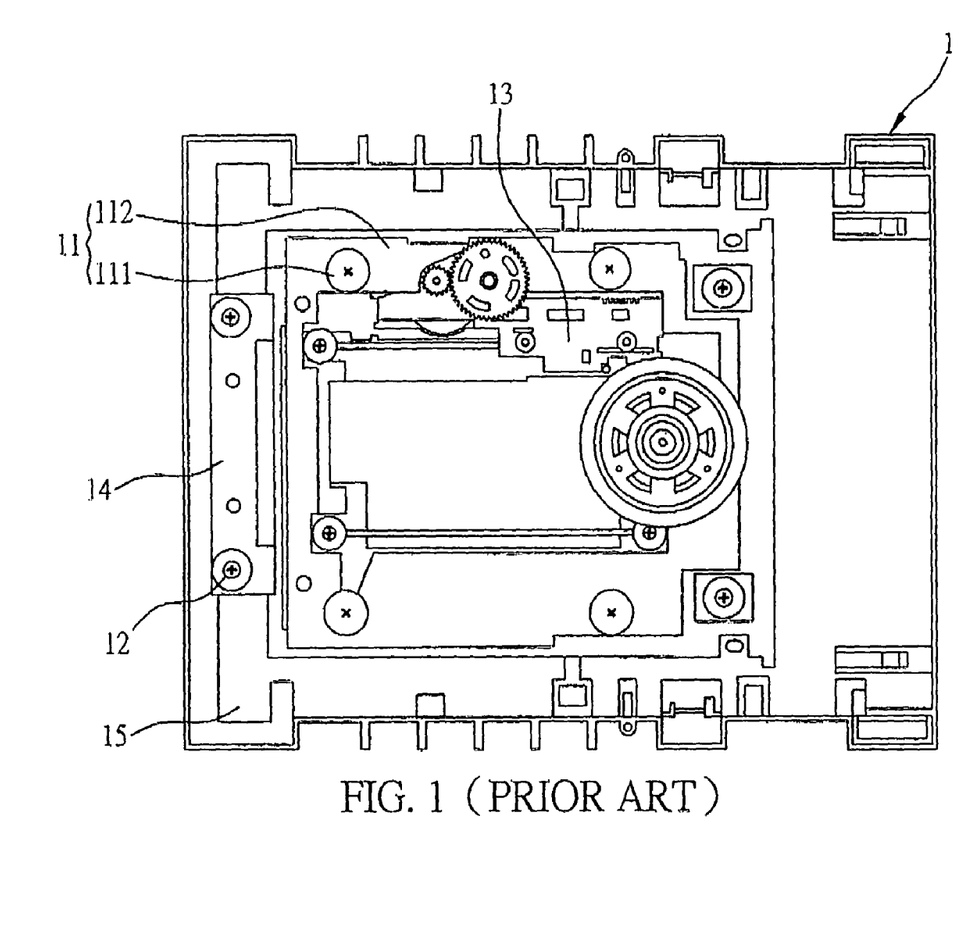
FIG. 1 (PRIOR ART) is a plane schematic diagram depicting a traditional vibration absorber applied to a disk drive.

Traditional dynamic vibration absorbers applied to disk drives can only absorb vibration for certain frequencies, for example those that have been successfully applied to disk drives by manufacturers such as Lite-ON, ASUS or Pioneer etc. FIG. 1 is a schematic view of a traditional vibration absorber 11 applied to a disk drive. The vibration absorber 11 consists of a plurality of second elastic members 111 and a damper associated with the second elastic member 111. The vibration absorber 11 is integrated to an optical disk drive module 13 of the disk drive 1. The optical disk drive module 13 is disposed on a carrier 14 with a first elastic member 12. The first elastic member 12 is coupled to a housing 15 of the disk drive 1. The first elastic member 12 reduces the vibration produced by the rotation of the optical disk drive module 13, whereas the vibration absorber 11 absorbs the vibration of the optical disk drive module 13.

Figure 2:
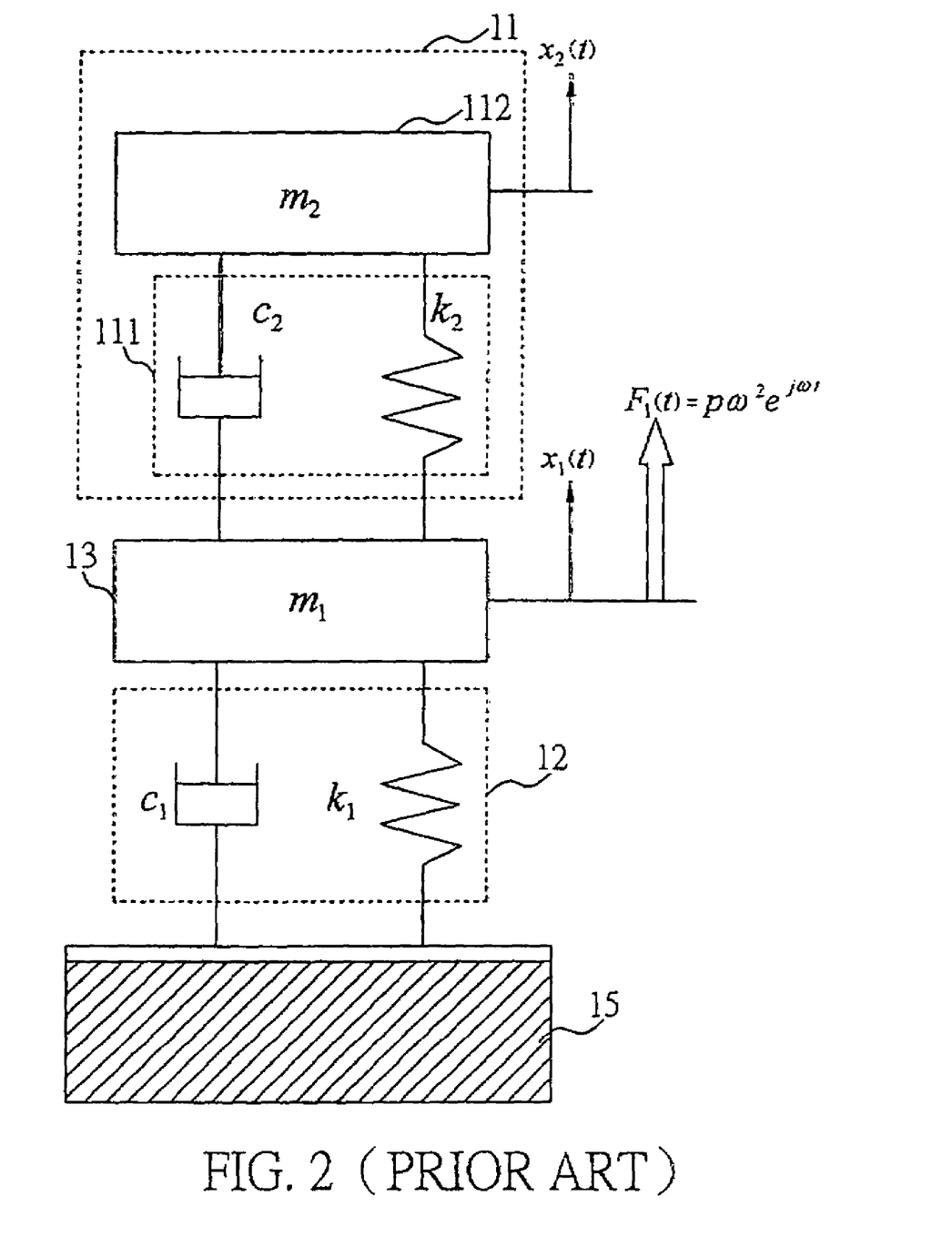
FIG. 2 (PRIOR ART) is a theoretical configuration of a traditional vibration absorber for a single rotational speed.

The theoretical configuration of the vibration absorber 11 disposed on the optical disk drive module 13 of the disk drive 1 is shown in FIG. 2, and the motion equations of the optical disk drive module 13 are represented by:

$$m_1\ddot{x}_1+c_1\dot{x}_1+c_2(\dot{x}_1-\dot{x}_2)+k_1x_1+k_2(x_1-x_2)=F(t)=p\omega^2 e^{j\omega}$$

$$m_2\ddot{x}_2+c_2(\dot{x}_2-\dot{x}_1)+k_2(x_2-x_1)=0$$

wherein $m_1$ is the mass of the optical disk drive module 13, $m_2$ is the mass of the damper 112, $x_1$ is the vibrating shift of the optical disk drive module 13, $x_2$ is the vibrating shift of the damper 112, F(t) is a function of the rotational unbalance force with respect to time, p is the amount of rotational unbalance, $\omega$ is the rotational speed, $k_1$ is the elasticity of the first elastic member 12, $k_2$ is the elasticity of the second elastic member 111, $c_1$ is the damping of the first elastic member 12 and $c_2$ is the damping of the second elastic member 111.

The above motion equations can be simplified such that the vibrating shift $x_1$ of the optical disk drive module 13 can be expressed as:

$$|X_1| = \frac{\sqrt{\{[k_2 - \omega^2 m_2]\Delta_R + c_2\omega\Delta_I\}^2 + \{c_2\omega\Delta_R - [k_2 - \omega^2 m_2]\Delta_I\}^2}}{\Delta_R^2 + \Delta_I^2} p\omega^2$$

As can be understood from the above, when the resonance frequency of the vibration absorber 11 equals the frequency of an external force, i.e., $$\sqrt{k_2/m_2} = \omega,$$

the vibrating shift of the optical disk drive module 13 is at minimum. However, the elasticity $k_2$ of the second elastic member 111 and the mass $m_2$ of the damper 112 are constant values, thus the absorber only absorbs vibration at a certain frequency (i.e. certain rotational speed). Once the rotational speed of the optical disk drive module 13 changes, the vibration cannot be effectively absorbed, sometimes even greater vibration is caused.

Thus, there is a need for a vibration absorber to suppress the vibration generated at various rotational speeds by the optical disk drive module and solve the shortcomings of the prior art.

SUMMARY OF THE INVENTION

In the light of forgoing drawbacks, an objective of the present invention is to provide a vibration absorber for suppressing the vibration generated by an optical disk drive module of a disk drive at various speeds.

In accordance with the above and other objectives, the present invention provides a vibration absorber provided on an optical disk drive module of a disk drive for suppressing vibration produced by the optical disk drive module at various speeds. The vibration absorber at least has a body, dampers, elastic members, an actuator and a controller. The body is secured on the optical disk drive module. The dampers elastically and vertically shift on the body. The elastic members are provided on the body for providing elasticity in shifting of the damper. The actuator is provided on the body and coupled to the damper for providing a driving force for the vertical shifting of the damper. The controller controls the driving force outputted by the actuator based on the change in rotational speed of the optical disk drive module, so as to change the elasticity in vertical shifting of the damper to reduce the shifting and corresponding vibration of the optical disk drive module.

The body can have a shape of horizontal H. In one preferred embodiment, the body can have a horizontal-H structure with two horizontal parts and a vertical part. The actuator can shift vertically with respect to the vertical part. The damper is provided on at least one side of the vertical part and coupled to a side of the actuator. The damper is preferably an object with a mass or inertia of moment, such as a metal plate or chunk. The damper may assume "H" shape, preferable, one provided on either side of the body.

The body may further comprise a guiding lever for twinning the elastic member. The elastic member is for example a spring coil, a spring plate, a rubber or other equivalent structures with rigidity and damping. The actuator is for example a voice coil motor (VCM), a piezoelectric transducer (PZT), an electrical actuator and a pneumatic actuator.

The controller controls the driving force of the actuator proportional to the working current of the actuator, and the rotational unbalance force is proportional to the square of the rotational speed of the optical disk drive module. The motion equations of the absorber 21 and the optical disk drive module are expressed as follow:

$$m_1\ddot{x}_1 + c_1\dot{x}_1 + c_2(\dot{x}_1 - \dot{x}_2) + k_1 x_1 + k_2(x_1 - x_2) + iK_f = F(t) = p\omega e^{j\omega}$$

$$m_2\ddot{x}_2 + c_2(\dot{x}_2 - \dot{x}_1) + k_2(x_2 - x_1) - iK_f = 0$$

wherein $m_1$ is the mass of the optical disk drive module, $m_2$ is the mass of the damper, $x_1$ is the vibrating shift of the optical disk drive module, $x_2$ is the vibrating shift of the damper, $F(t)$ is a function of the rotational unbalance force with respect to time, p is the amount of rotational unbalance, $\omega$ is the rotational speed, $k_1$ is the elasticity of the first elastic member, $k_2$ is the elasticity of the second elastic member, c1 is the damping of the first elastic member, $c_2$ is the damping of the second elastic member, $K_f$ is the force constant of the actuator and i is the working current of the actuator.

When $i = b(x_1 - x_2)$ the vibrating shift of the optical disk drive module can be expressed as:

$$|X_1| = \frac{\sqrt{\{[(k_2 + bK_f) - \omega^2 m_2]\Delta_R + c_2\omega\Delta_I\}^2 + \{c_2\omega\Delta_R - [(k_2 + bK_f) - \omega^2 m_2]\Delta_I\}^2}}{\Delta_R^2 + \Delta_I^2} p\omega^2$$

wherein b is current constant; it is known that if $$b = \frac{\omega^2 m_2 - k_2}{K_f},$$

the vibrating shift of the optical disk drive module is at minimum. When the rotational speed of the optical disk drive module or the frequency of the external force changes, the vibration absorber adjusts the value of b, so that the vibration of the optical disk drive module is kept at minimum. Therefore, the vibration absorber of the present invention has at least the advantages of a simple structure with fewer components and easy assembly, while effective reducing vibration at various rotational speeds of the optical disk drive module of the disk drive, thereby allowing smooth and stable read/write process of discs.

Thus, the vibration absorber of the present invention solves the problem of having no substantial effect of vibration absorption in the case of the optical disk drive module of a traditional disk drive changes speed.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE EMBODIMENTS

The present invention is described by the following specific embodiments. Those with ordinary skills in the arts can readily understand the other advantages and functions of the present invention after reading the disclosure of this specification. The present invention can also be implemented with different embodiments. Various details described in this specification can be modified based on different viewpoints and applications without departing from the scope of the present invention. It should be noted that the appended drawings are only schematic diagrams showing the basic principles of the present invention. Thus, only those elements related to the present invention are shown and may not be drawn to scale and actual quantity. The quantity, scale and configuration of the various elements in actual implementation may be a modification without undue effort. The actual layout may be more complicated.

The embodiments below further describes the aspects of the present invention, they should be construed in a non-limiting sense.

Figure 3:
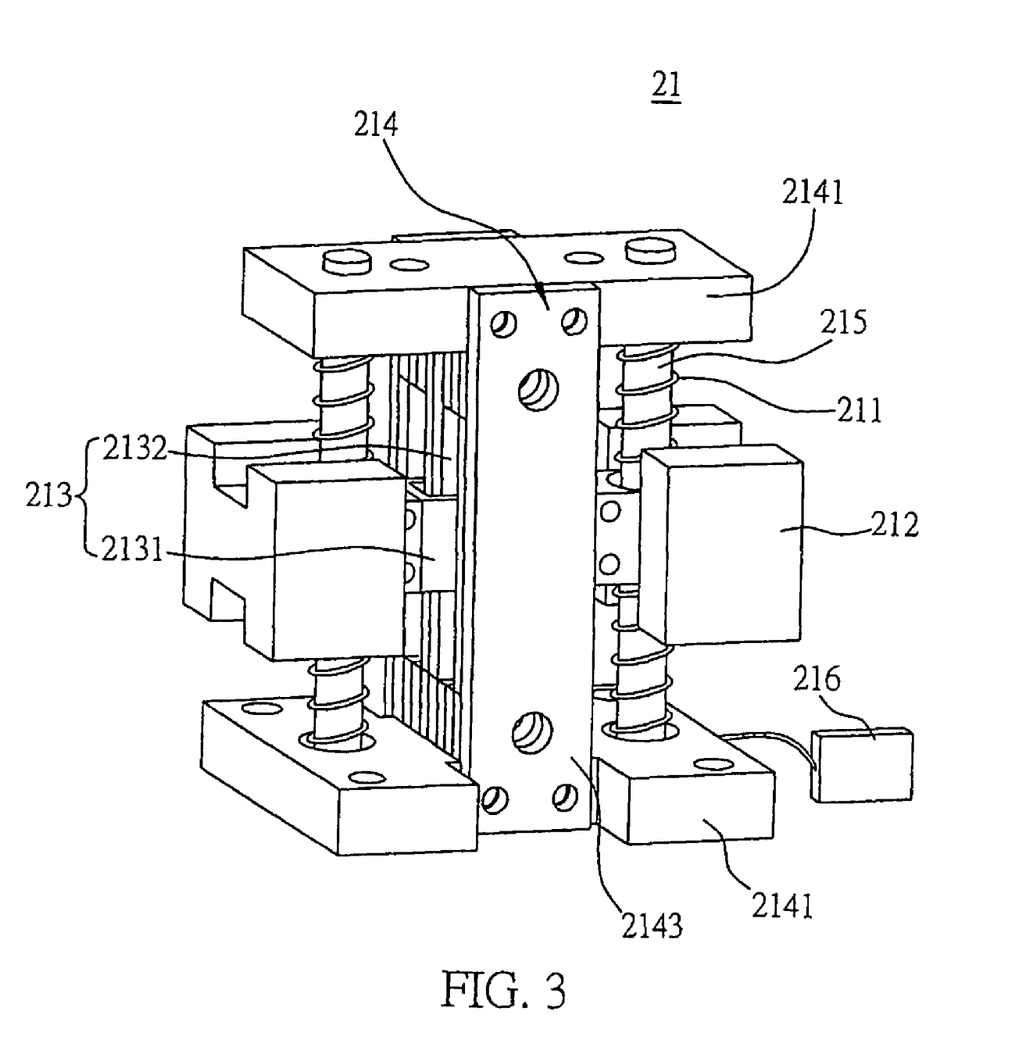
FIG. 3 is a stereogram of a vibration absorber of the present invention.
Figure 4:
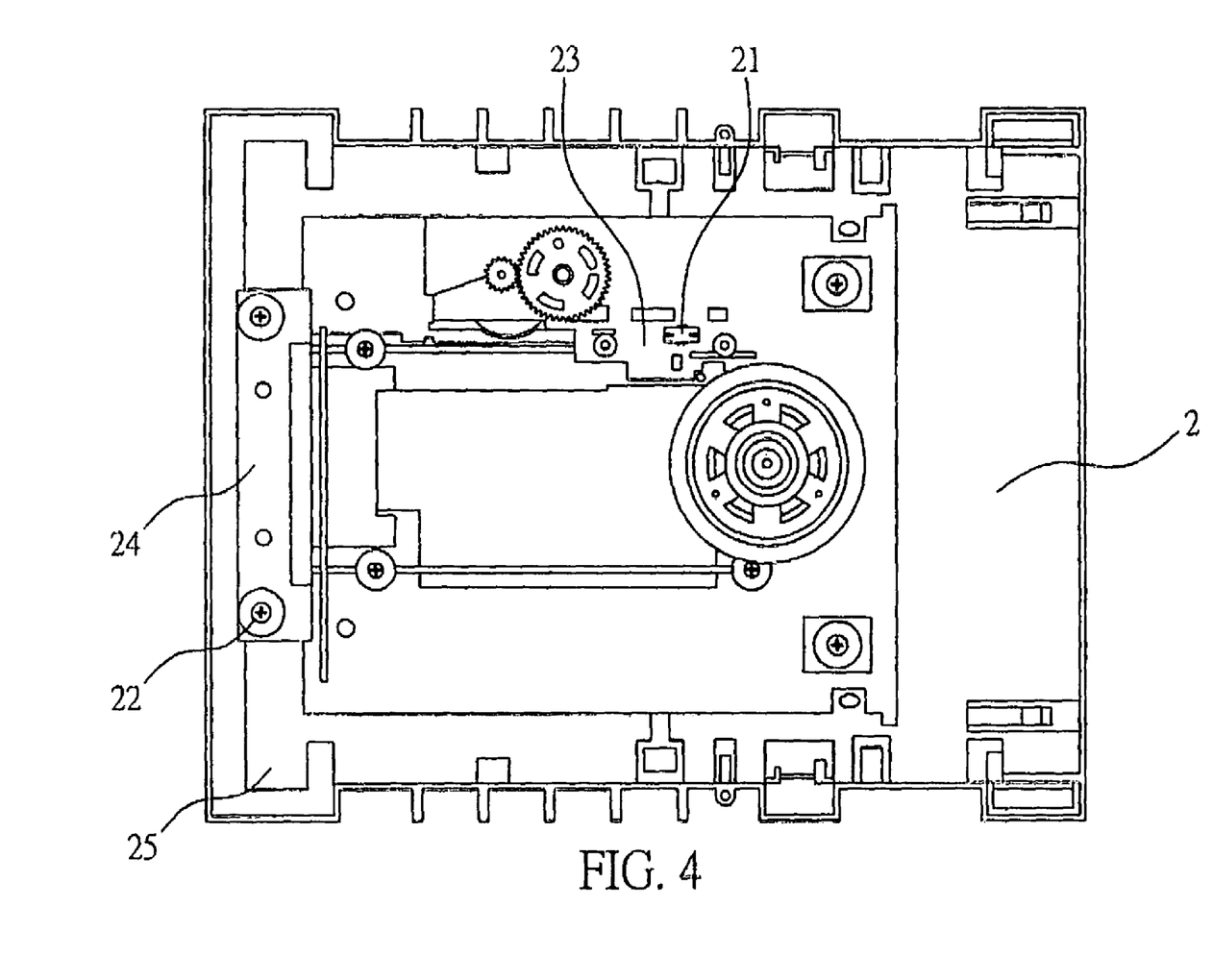
FIG. 4 is a plane diagram of the vibration absorber of the present invention applied to an optical disk drive module of a disk drive.

Referring to FIGS. 3 and 4, which show a stereogram of a vibration absorber 21 of the present invention and a plane diagram of the vibration absorber 21 applied to an optical disk drive module 23 of a disk drive 2, respectively. As shown, the vibration absorber 21 is provided on the optical disk drive module 23 of the disk drive 2 for suppressing vibration produced at various speeds of the optical disk drive module 23. The vibration absorber 21 comprises: a body 214, a damper 212, an elastic member 211, an actuator 213 and a controller 216.

In this embodiment, the vibration absorber 21 is illustrated as applying to the optical disk drive module 23 of the disk drive 2. The optical disk drive module 23 is provided on a carrier 24 with a first elastic member 22. The first elastic member 22 is coupled to a housing 25 of the disk drive 2, and the first elastic member 22 is used to reduce the vibration produced by the optical disk drive module 23.

The body 214 of the vibration absorber 21 is fixedly secured to the optical disk drive module 23. The body 214 has a shape of a "horizontal H" with two horizontal parts 2141 and a vertical part 2143. The actuator 213 can be vertically shifted with respect to the vertical part 2143. The damper 212 is provided to at least one side of the vertical part and coupled to a side of the actuator 213. In this embodiment, two sides of the body 214 may respectively have a guiding lever 215, and the actuator penetrates the vertical part 2143 and can be vertically slid along the vertical part 2143.

The damper 212 is disposed in such a way that it can be elastically moved up/down on the body 214. The damper 212 is an object with a mass or moment of inertia, such as a metal plate or metal chunk. In this embodiment, two H-shaped dampers 212 are disposed on either side of the vertical part 2143 of the body 214 and fixedly coupled to two sides of the actuator 213, respectively, such that they vertically shift up/down with the actuator 213.

The elastic member 211 is disposed on the body 214 for providing elasticity to the vertical movement of the damper 212. The elastic member 211 is for example a spring coil, a spring plate, rubber or other equivalent structures with damping and rigidity. In this embodiment, two elastic members 211 are respectively provided surrounding the guiding levers 215 on both sides of the body 214 and combined with the dampers 212.

The actuator 213 is provided on the body 214 and coupled to the dampers 212 for providing the vertical movement of the damper 212. In this embodiment, the actuator penetrates the vertical part 2143 and can be vertically slid along the vertical part 2143. The actuator 213 is a voice coil motor (VCM) consisted of a coil 2131 and a magnet 2132. Of course in other embodiments, the actuator can be for example a piezoelectric transducer (PZT), electrical actuator or pneumatic actuator.

The controller 216 controls the driving force outputted by the actuator 213 based on the change in rotational speed of the optical disk drive module 23, which in turn changes the elasticity of the vertical movement of the dampers 212 to absorb the vibration and shifting caused by the vibration of the optical disk drive module 23.

Figure 5:
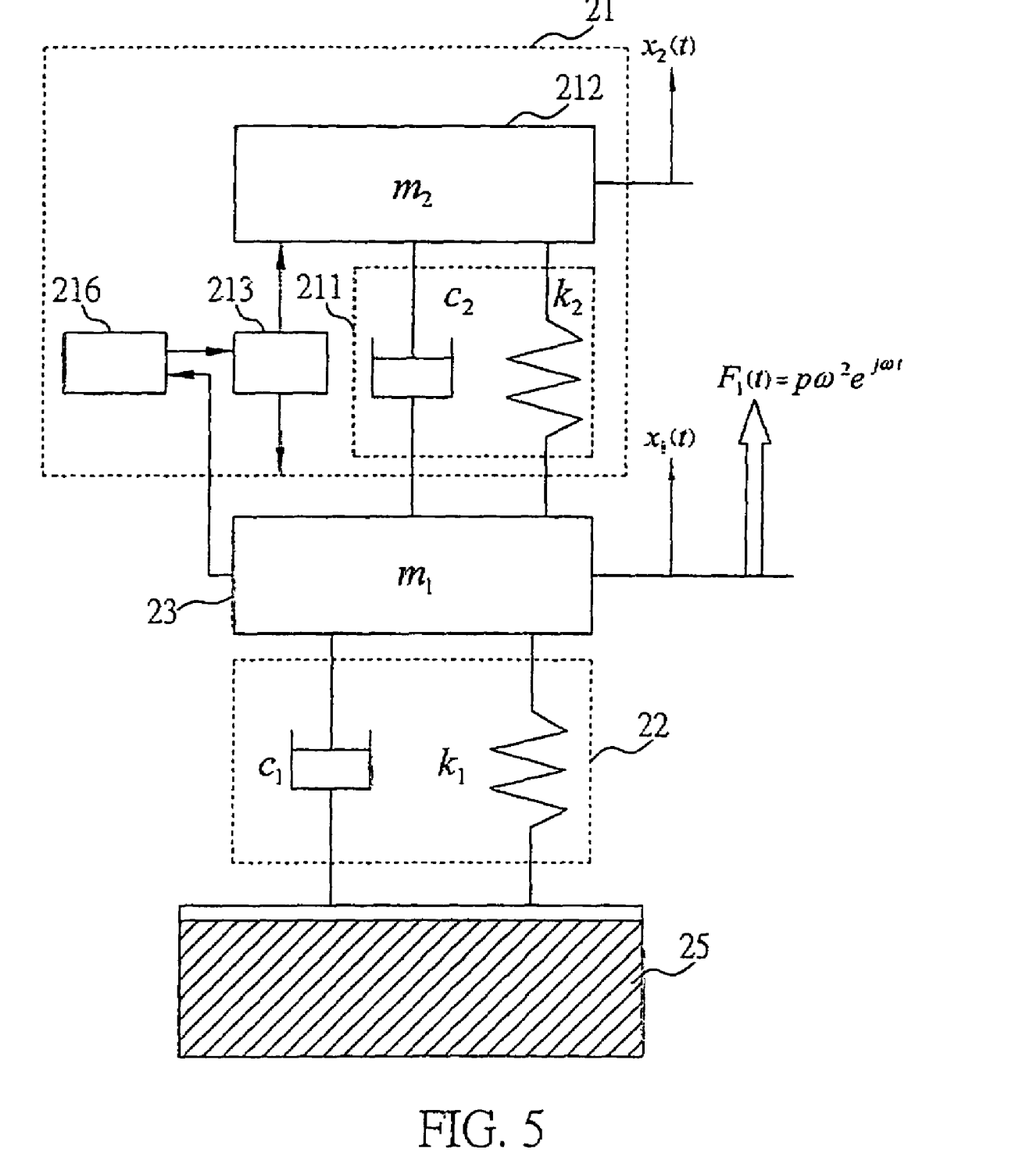
FIG. 5 is a theoretical configuration of the vibration absorber of the present invention.

Referring to FIG. 5, the controller 216 controls the driving force of the actuator 213 proportional to the working current of the actuator 213, and the rotational unbalance force is proportional to the square of the rotational speed of the optical disk drive module 23. The motion equations of the absorber 21 and the optical disk drive module 23 are expressed as follow:

$$m_1\ddot{x}_1 + c_1\dot{x}_1 + c_2(\dot{x}_1 - \dot{x}_2) + k_1 x_1 + k_2(x_1 - x_2) + iK_f = F(t) = p\omega^2 e^{j\omega}$$

$$m_2\ddot{x}_2 + c_2(\dot{x}_2 - \dot{x}_1) + k_2(x_2 - x_1) - iK_f = 0$$

wherein $m_1$ is the mass of the optical disk drive module 23, $m_2$ is the mass of the damper 212, $x_1$ is the vibrating shift of the optical disk drive module 23, $x_2$ is the vibrating shift of the damper 212, $F(t)$ is a function of the rotational unbalance force with respect to time, p is the amount of rotational unbalance, $\omega$ is the rotational speed, $k_1$ is the elasticity of the first elastic member 12, $k_2$ is the elasticity of the second elastic member 111, $c_1$ is the damping of the first elastic member 12, $c_2$ is the damping of the second elastic member 111, $K_f$ is the force constant of the actuator 213 and i is the working current of the actuator 213.

When $i = b(x_1 - x_2)$ the vibrating shift of the optical disk drive module 23 can be expressed as:

$$|X_1| = \frac{\sqrt{\{[(k_2 + bK_f) - \omega^2 m_2]\Delta_R + c_2\omega\Delta_I\}^2 + \{c_2\omega\Delta_R - [(k_2 + bK_f) - \omega^2 m_2]\Delta_I\}^2}}{\Delta_R^2 + \Delta_I^2} p\omega^2$$

wherein b is current constant; it is known that if $$b = \frac{\omega^2 m_2 - k_2}{K_f},$$

the vibrating shift of the optical disk drive module 23 is at minimum. When the rotational speed of the optical disk drive module 23 or the frequency of the external force changes, the vibration absorber 21 adjusts the value of b, so that the vibration of the optical disk drive module 23 is kept at minimum. Therefore, the vibration absorber 21 of the present invention has at least the advantages of a simple structure with fewer components and easy assembly, while effective reducing vibration at various rotational speeds of the optical disk drive module 23 of the disk drive 2, thereby allowing smooth and stable read/write process of discs.

Figure 6A:
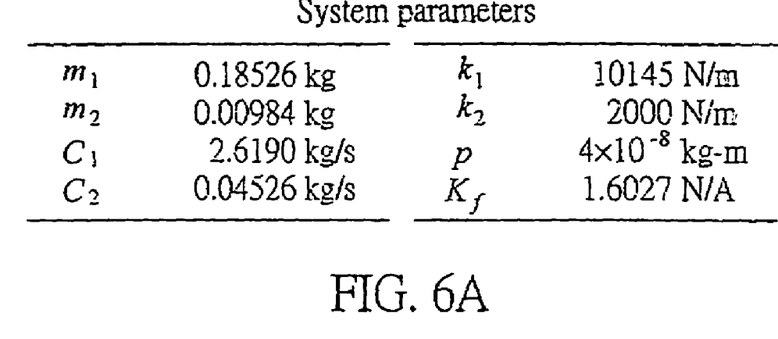
FIG. 6A shows system parameters of the vibration absorber of the present invention.
Figure 6B:
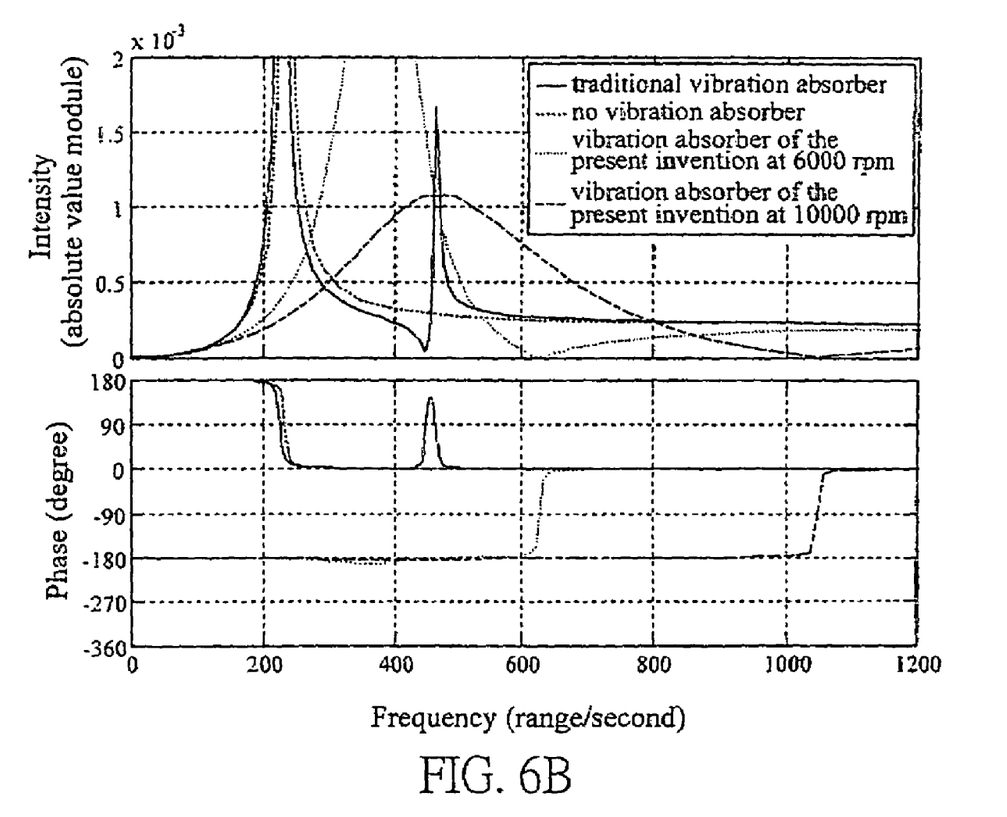
FIG. 6B shows vibration simulations of the optical disk drive module on a disk drive with the vibration absorber of the present invention, without the vibration absorber and with a traditional vibration absorber, respectively.
Figure 6C:
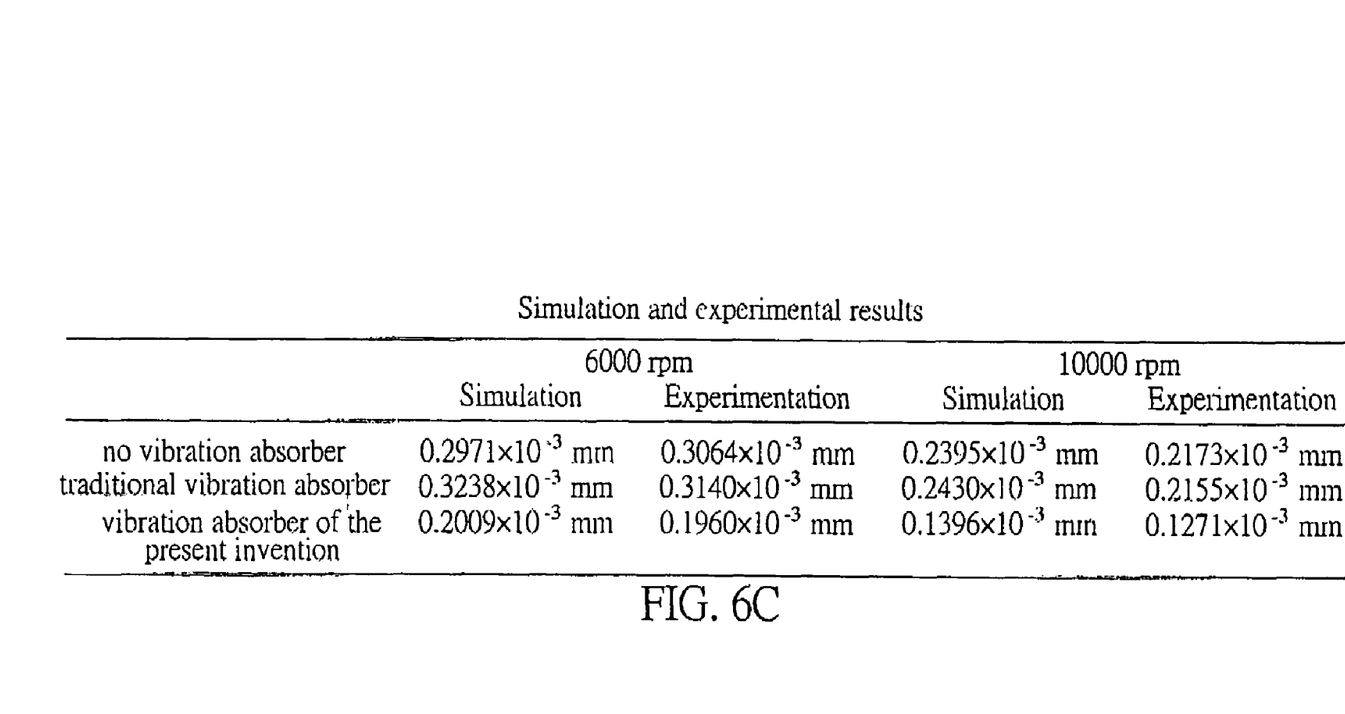
FIG. 6C shows vibration simulations versus experiment results of the optical disk drive module on a disk drive with the vibration absorber of the present invention, without the vibration absorber and with a traditional vibration absorber, respectively

Referring to FIGS. 6A to 6C, in which FIG. 6A shows system parameters of the vibration absorber 21 of the present invention; FIG. 6B shows vibration simulations of the optical disk drive module on a disk drive with the vibration absorber 21 of the present invention, without the vibration absorber and with a traditional vibration absorber, respectively; and FIG. 6C shows vibration simulations versus experiment results of the optical disk drive module on a disk drive with the vibration absorber 21 of the present invention, without the vibration absorber and with a traditional vibration absorber, respectively. As shown, the traditional vibration absorber (solid line) can only effectively absorb vibration of the optical disk drive module at fixed frequencies, while the present invention shifts the curve valley based on the rotational speed or external frequency (FIG. 6B uses rotational speeds of 6000 rpm and 10000 rpm as the embodiment of the present invention). The vibration absorber 21 of the present invention has an increase in absorption efficiency of 38% and 42% at rotational speeds of 6000 rpm and 10000 rpm, respectively, compared to the traditional vibration absorber.

In summary, the vibration absorber 21 of the present invention comprises a body 214, an actuator 213, dampers 212, elastic members 211 and a controller 216. The rigidity and damping of the elastic member 211 can be regarded as $k_2$ and $c_2$ of the system; the mass of the damper 212 can be regarded as $m_2$ of the system. Since the driving force provided by the actuator 213 is the product of current i and force constant $K_f$. From the above theories and equations, it can be understood that the vibration of the optical disk drive module 23 at various speeds is kept at minimum by adjusting the current that controls the actuator 213, thereby vibration is effectively absorbed, solving the various shortcomings of the prior art while having high industrial value.

The above embodiments are only used to illustrate the principles of the present invention, and they should not be construed as to limit the present invention in any way. The above embodiments can be modified by those with ordinary skills in the arts without departing from the scope of the present invention as defined in the following appended claims.

What is claimed is:

1. A vibration absorber provided on an optical disk drive module of a disk drive for suppressing a vibration produced by the optical disk drive module at various speeds, the vibration absorber comprising:

a body secured to the optical disk drive module;

at least one damper elastically and vertically shifting on the body;

at least one elastic member provided on the body for providing elasticity in shifting of the damper;

an actuator provided on the body and coupled to the damper for providing a driving force for the vertical shifting of the damper, wherein the actuator penetrates a vertical part of the body and can be vertically slid along the vertical part, and the actuator includes a coil and a magnet, in which the magnet is attached to the body and the coil is connected to the damper; and a controller for controlling the driving force by the actuator based on a change in rotational speed of the optical disk drive module, so as to change the elasticity in vertical shifting of the damper to reduce the shifting corresponding to the vibration of the optical disk drive module.

2. The vibration absorber of claim 1, wherein the at least one elastic member is at least one selected from the group consisting of a spring coil, a spring plate and a rubber.

3. The vibration absorber of claim 1, wherein the damper is an object having a mass and is selected from one of a metal plate and a metal chunk.

4. The vibration absorber of claim 1, wherein the damper is an object having a moment of inertia and is selected from one of a metal plate and a metal chunk.

5. The vibration absorber of claim 1, wherein the damper has a shape of H.

6. The vibration absorber of claim 1, wherein the number of dampers is two.

7. The vibration absorber of claim 1, wherein the body has a shape of a horizontal H.

8. The vibration absorber of claim 1, wherein the body has a shape of a horizontal H comprising two horizontal parts and a vertical part, the actuator being able to shift vertically with respect to the vertical part, the damper being provided on at least one side of the vertical part and coupled to a side of the actuator.

9. The vibration absorber of claim 1, wherein the body further comprises a guiding lever for twinning the elastic member.

10. The vibration absorber of claim 1, wherein the actuator is one selected from the group consisting of a voice coil motor (VCM), a piezoelectric transducer (PZT), an electrical actuator and a pneumatic actuator.

11. The vibration absorber of claim 1, wherein the driving force by the actuator is provided based on a force constant and a working current of the actuator varied with the change in rotational speed of the optical disk drive module.

12. A vibration absorber provided on an optical disk drive module of a disk drive for suppressing a vibration produced by the optical disk drive module at various speeds, the vibration absorber comprising:

a body secured to the optical disk drive module;

at least one damper elastically and vertically shifting on the body;

at least one elastic member provided on the body for providing elasticity in shifting of the damper;

an actuator provided on the body and coupled to the damper for providing a driving force for the vertical shifting of the damper; and a controller for controlling the driving force by the actuator based on a change in rotational speed of the optical disk drive module, so as to change the elasticity in vertical shifting of the damper to reduce the shifting corresponding to the vibration of the optical disk drive module, wherein the controller adjusts a value of current constant $b=\omega^2 m_i - k_i/K_f$, so as to keep a vibration of the optical disk drive module minimum, wherein $K_f$ is a force constant of the actuator, $\omega$ is a rotational speed, $m_i$ is a mass of the at least one damper, $k_i$ is an elasticity of the at least one elastic member.

13. The vibration absorber of claim 12, wherein the at least one elastic member is at least one selected from the group consisting of a spring coil, a spring plate and a rubber.

14. The vibration absorber of claim 12, wherein the damper is an object having a mass and is selected from one of a metal plate and a metal chunk.

15. The vibration absorber of claim 12, wherein the damper is an object having a moment of inertia and is selected from one of a metal plate and a metal chunk.

16. The vibration absorber of claim 12, wherein the damper has a shape of H.

17. The vibration absorber of claim 12, wherein the number of dampers is two.

18. The vibration absorber of claim 12, wherein the body has a shape of a horizontal H comprising two horizontal parts and a vertical part, the actuator being able to shift vertically with respect to the vertical part, the damper being provided on at least one side of the vertical part and coupled to a side of the actuator.

19. The vibration absorber of claim 12, wherein the body further comprises a guiding lever for twinning the elastic member.

20. The vibration absorber of claim 12, wherein the actuator is one selected from the group consisting of a voice coil motor (VCM), a piezoelectric transducer (PZT), an electrical actuator and a pneumatic actuator.

* * * * *